Sept. 6, 1938.　　　　　　G. MANN　　　　　　2,129,501

FITTED SHOE PACKING BOX

Filed Aug. 30, 1935　　　3 Sheets-Sheet 1

INVENTOR.
Gordon Mann
BY Gardner W. Pearson
ATTORNEY.

Sept. 6, 1938.   G. MANN   2,129,501

FITTED SHOE PACKING BOX

Filed Aug. 30, 1935   3 Sheets-Sheet 2

INVENTOR.
Gordon Mann
BY Gardner W. Pearson
ATTORNEY.

Sept. 6, 1938.  G. MANN  2,129,501
FITTED SHOE PACKING BOX
Filed Aug. 30, 1935  3 Sheets-Sheet 3
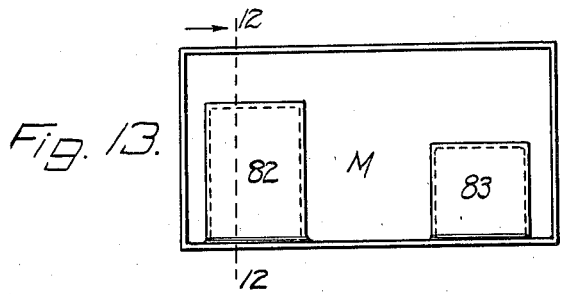
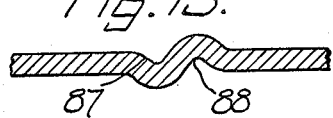
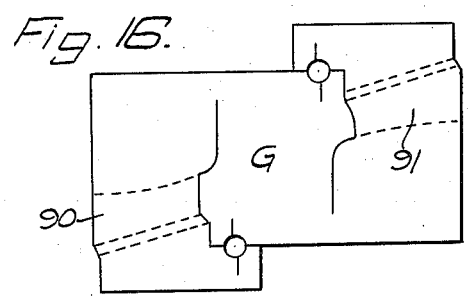
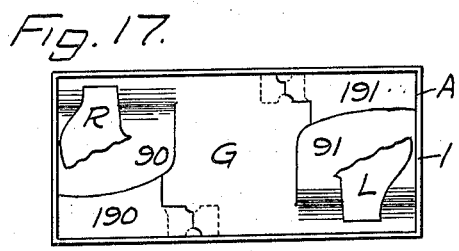
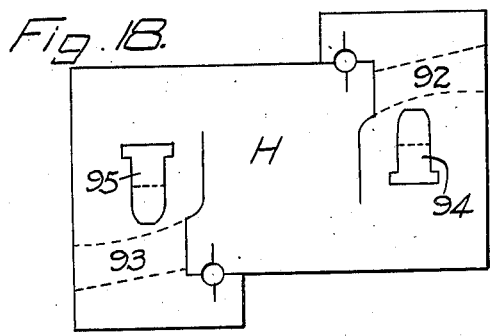
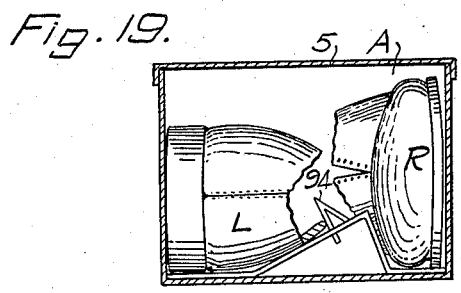
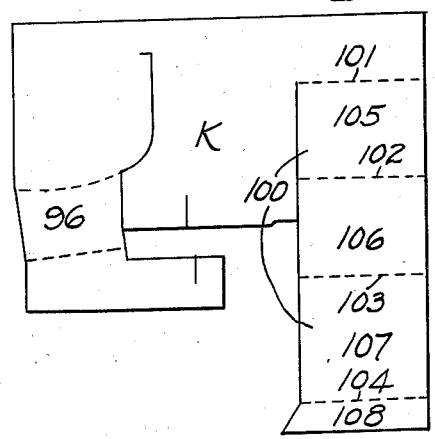
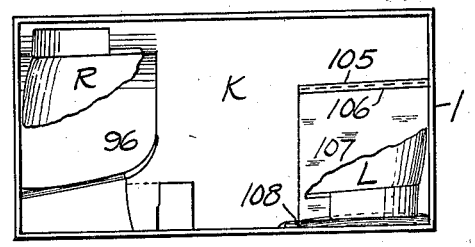
INVENTOR.
Gordon Mann
BY Gardner W. Peirson
ATTORNEY.

Patented Sept. 6, 1938

2,129,501

UNITED STATES PATENT OFFICE 2,129,501

FITTED SHOE PACKING BOX

Gordon Mann, Winchester, Mass.

Application August 30, 1935, Serial No. 38,551

5 Claims. (Cl. 206—46)

This invention relates to the commercial methods of packing and shipping shoes. Shoes are generally packed two in a box, a pair of shoes including one left and one right, and for convenience in displaying on store shelves, there are generally used a limited number of sizes of boxes, but it is highly desirable that any one of from 6 to 12 shoe sizes should be capable of being packed in a single size of box.

The shoe sizes to be packed in the same size of box may vary two inches in length and from one-half to three-quarters of an inch in width and perhaps one-half inch in thickness or depth. They are usually packed with an edge of the sole at the bottom of the box. Especially where the smaller sizes are packed in a box, and the box is shipped in the usual course of trade and is tipped upside down and even thrown about in different ways, the shoes press against each other and especially if any part, such as the toes or counters are slightly damp, the part of the other shoe which comes in contact makes a depression which when that shoe is taken out of the box makes it unsightly and less salable.

The rubbing or chafing of a part of one shoe against another or against anything else caused by shucking or moving in the box is also very objectionable.

The shapes of the front part, back part, heels and ornamentation of shoes of the same size vary so much that packing various sizes and shapes in similar boxes is a serious problem.

Ladies' shoes with high, curved and tapering heels are most troublesome, but any pair of shoes packed loosely in a box in which they do not fit closely, even if wrapped in tissue paper in the usual way, injure each other by pressing one against the other in the wrong place, thereby distorting the correct shape of the shoe. When shoes are taken out of the box for display or for sale, they should have the perfect shape which they had when they left the last and the shoe factory. Any distortion is highly objectionable.

This invention is a fitted box for a pair of shoes. It may be a permanent part of the bottom of a regular shoe box or carton or it may be a folded blank of suitable form placed in the bottom of a shoe box.

The parts are so made that one or both shoes, especially when wrapped in paper in the usual way and by the usual procedure, is supported at the proper angle by two or more stiff parts, such as the edge of the sole, the heel or the counter, with no distortable part of one shoe in contact with any stiff part of the other shoe or of the packing, and in such a way that neither shoe will slip out of place, or rub, chafe or scuff against the other or against any part of the box.

My object is attained by so supporting the back part, the heel or counter or both, that one or both shoes firmly rest at the desired angle.

In the drawings, Fig. 1 shows a preferred form of pasteboard blank properly cut but before bending and before insertion in a shoe box.

Fig. 13 is a plan view of the box shown in Fig. 12.

Figs. 14 and 15 are detailed cross sectional views showing the preferred types of cuts and creases.

Fig. 16 shows a modification of a blank supporting member before bending, and Fig. 17 shows the same blank in a shoe box.

Fig. 18 shows still another blank supporting member, while Fig. 19 shows a cross section similar to Fig. 7, showing how the tongues help to hold a shoe in position.

Fig. 20 is a plan view of another blank supporting member before bending, and Fig. 21 shows the same supporting member bent and in position in a shoe box.

Figure 1:
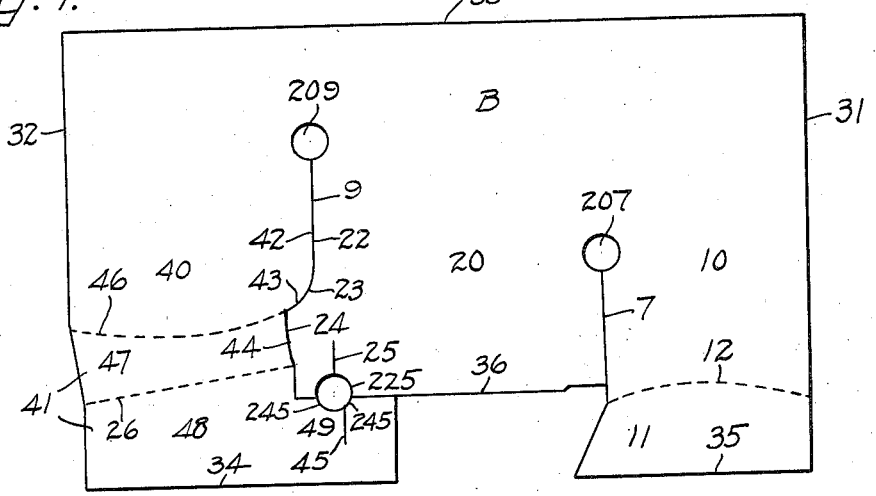

In Figs. 17 and 21, parts of shoes are shown to show the construction.

In the drawings, A represents a shoe box of the usual rectangular parallelopiped form with the front end 1, back end 2, sides 3 and 4, top 5 and bottom 6. Such boxes are known in the trade as cartons.

As shown, B represents a supporting member made of flat bendable cardboard of substantially rectangular shape, its length represented by the right side 33 being slightly less than the length of the box and its ends 31 and 32 being substantially wider than the ends of box A. The other side is cut out between 35 and 34 forming an edge 36 of the middle part 20 between wings 10 and 40. The cuts 7 and 9 separate the blank into the wings 10 and 40 and the middle part 20.

Wing 10 is punched or creased or both at 12, part way through the material on the upper side and suitably creased in a curve the distance from edge 33 to 12, being about the same as the front end 1 of box A. 11 is a flap which extends from wing 10 and which can be bent down on the line of 12 so as to support the end of wing 10 a distance from the bottom of the supporting member B which will conform more or less to the heel 50 of the left shoe L.

The curve at 12 prevents flap 11 from doubling under 10 when the supporting members or blanks B, B are being shipped from the box factory to the shoe factory in an empty box A.

The flat side 52 including the left side of counter 53 rests on the bottom 6 of the box, while the heel 50 is held up so that the shoe is in a stable position.

40 is another wing having a double flap 41 provided with perforations or a crease 46 on a curve and with another crease 26, both at a slightly acute angle with the back edge 32 so that the part 47 of flap 41, when bent down, will be substantially vertical, will not fold under wing 40 on account of the curve 46, will make wing 40 curve and thus be stiffer and will fit the heel 60 and counter 63 of the right shoe R. The other part 48 of flap 41 rests flat on the bottom and against the bottom of left side 4 of box A.

Figure 2:
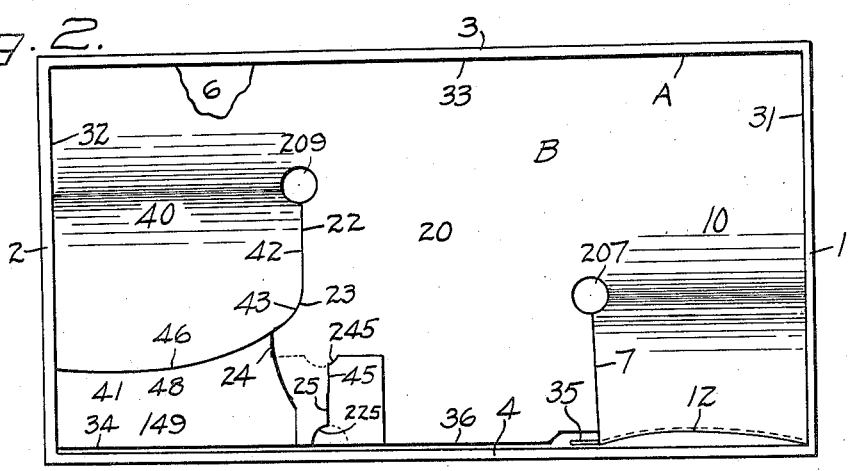
Fig. 2 shows the blank of Fig. 1 in position in a shoe box.

The cut 7 is substantially straight but cut 9 is straight where it divides the edge 22 of 20 from the edge 42 of 40, and curves around at 23 and 43, thence in an irregular line at 24 and 44, and then around to form a locking flap 49 which is part of 48 in which is a cut 45 which, as shown in Fig. 2, engages cut 25, locking the middle part 20 and the wing 40 so that they cannot move from side to side. These parts form a pocket 149 for the toe 54 of the left shoe L.

Every shoe is shaped so that what fits the inner side on the human foot is relatively straight or flat as compared with its outer side, as indicated at 52 and 62, and it will rest better on such flat side. With my device, preferably, the flat side 52 of left shoe L rests on the bottom while the flat side 62 of right shoe R is at the top. The soles 51 and 61 are substantially parallel, lying in planes which slant at a slight angle with the sides of box A when all the parts are in place, and there are no stiff parts of one shoe which touch the other shoe while the points of support are all stiff parts.

To prevent tearing, I prefer to punch holes 207, 209 at the ends of 7 and 9 and to make curves 225 and 245 to make it easier to engage cuts 25 and 45.

While the supporting member may be glued or otherwise fastened to the bottom 6 of the box A, it is usually cut and then the flaps such as 11 and 41 are bent down. It is then placed in the box which is shipped to the shoe factory.

Figure 3:
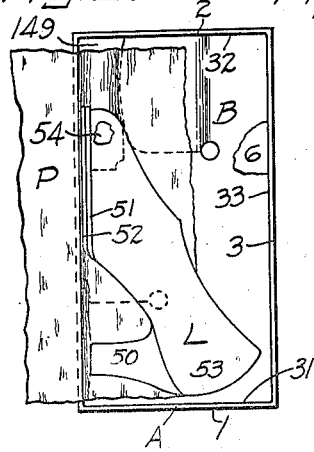
Fig. 3 shows the same shoe box and blank with the paper and left shoe in place.
Figure 4:
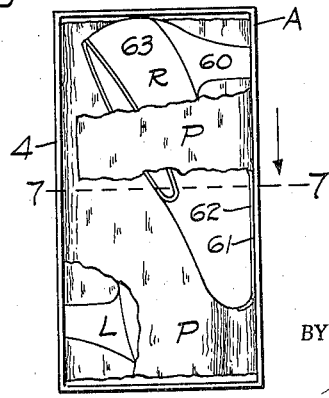
Fig. 4 is similar to Fig. 3 but shows the right shoe and paper in place.
Figure 5:
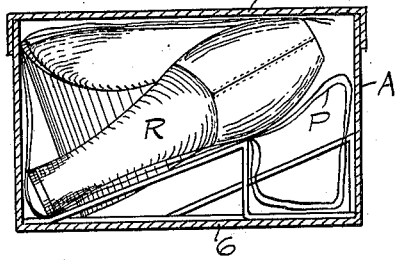
Fig. 5 is a view from the back of a box packed with a pair of shoes such as shown in Fig. 4 with the back removed but the cover in position.
Figure 6:
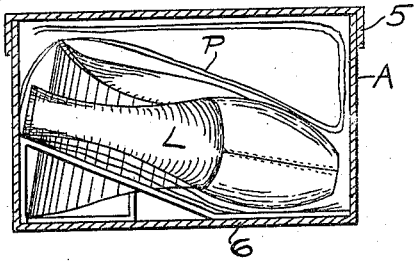
Fig. 6 is a view similar to Fig. 5 but from the front instead of from the back, and with the front of box removed.
Figure 7:
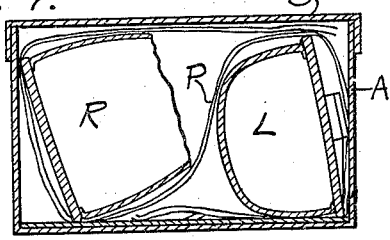
Fig. 7 is a view as on the line 7—7 of a box with a pair of shoes packed in it and with the cover in place, ready for shipping.

The operator who packs the shoes proceeds in the usual way with the front 1 of the box nearest him. He takes a sheet of tissue paper P which he places in the box with its edge near the right side. He then takes the left shoe L with the flat side 52 down and places it on the paper with its toe in the pocket 149 as shown in Fig. 3. He then folds over the paper, as shown in Fig. 4, and then places the right shoe R with the flat side 62 up. He then folds back the paper over both shoes and puts on the cover 5 and then the box is ready for shipment. The position of the parts are shown in Figs. 5, 6 and 7.

Figure 8:
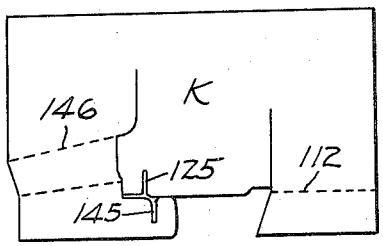
Fig. 8 is a view of a modification of the blank shown in Fig. 1.

The supporting member K, shown in Fig. 8, is substantially the same as B except that the bending cuts or perforations at 112 and 146 are straight instead of being curved like 12 and 46, and the cuts 145 and 125 are slots instead of being like 45 and 25.

Figure 9:
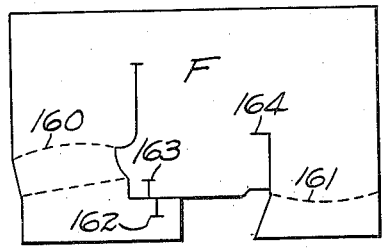
Fig. 9 shows another modification of the blank shown in Fig. 1.

In Fig. 9, the blank F has the creases for bending at 160 and 161, curved in the opposite direction from those shown in Fig. 1, and instead of the circles at the ends of the cuts, short cross cuts such as 162, 163 and 164 are used to prevent tearing.

Figure 10:
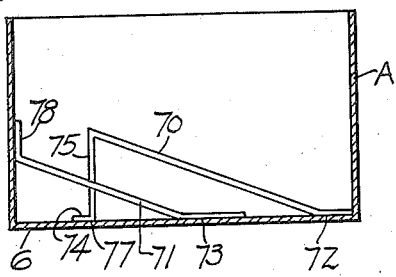
Fig. 10 is a view similar to Fig. 6 showing a fitted packing box for shoes with the supporting member formed in two parts and attached to the bottom of the box.
Figure 11:
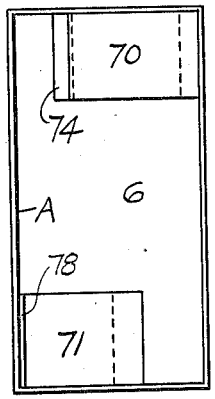
Fig. 11 is a plan view of the device shown in Fig. 10.

In Figs. 10 and 11, two unconnected blanks or wings 70 and 71 are used, but these are suitably bent and fastened by glue 72 and 73 to the bottom 6 of the box. The edge 74 of the bottom of the double flap 75 of wing 70 does not engage the side of the box but is glued at 77 to the bottom while the top 78 of the wing 71 is bent upward against the side of the box.

Figure 12:
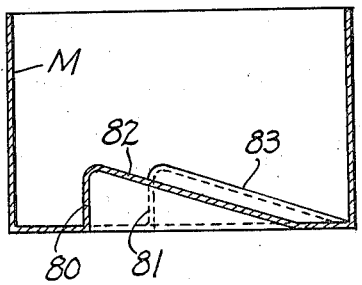
Fig. 12 is a view of such a box in which there are two parts of the supporting member integral with and forming part of the regular bottom of the box on line 12—12 of Fig. 13.

In Figs. 12 and 13, the wings and flaps are formed by pressing upward the bottom of the box M at 80, 81, 82 and 83, the shape being substantially the same as where a separate blank is used for the supporting member. This is suitable for shoes with low heels, the bottom of the heel of the left shoe being at the top of 82 and the counter at the bottom, while the bottom of the heel of the right shoe is at the bottom of 83 and the counter is at the top.

In Fig. 14 is shown my preferred method of creasing at 86 and cutting at 85, this cutting being shown as continuous, while the cutting 46, 26, 12, 146, 112, 160 and 161 and other places being shown as broken until the blank is bent.

In Fig. 15 is shown a double crease at 87 and 88 which can be used to facilitate the bending of the flaps from the wings without breaking them.

In Fig. 16 is shown a blank G with wings 90 and 91 which are both like the wings 40 in Figs. 1 to 7.

As shown in Fig. 17, when folded and put in a box, there are two pockets formed 190 and 191 between the respective wings 90 and 91 and the sides of the box. For some shoes, this construction is desirable. It will be observed that instead of both wings being on the same side, they are on opposite sides.

In Fig. 18 is shown a blank H which is similar to G as it has wings 92 and 93 similar to 90 and 91 and also similar to 40, but in addition, each wing has a tongue or double tongue 95 or 94 which when bent as shown in Fig. 19, fits into the inside of a shoe and tends to hold it in place.

In Fig. 20 blank K has one wing 96 substantially similar to 90, 91, 92, 93 and 40 except that it is cut so that it will rise higher. This would only be used to support the right counter 63. At the back, however, there is a wing 100 which is cut from the material and bent at 101, 102, 103 and 104 so that there is formed between the folds 105 and 106, a vertical partition, and at 107, a heel supporting part of the wing supported by the part 108. This blank K follows the same idea as the others, as it provides a heel rest for each shoe, at least one pocket for one of the toes and should be so cut and formed as to allow or require each shoe to rest on three relatively hard and stiff points of support such as parts of the heel, the counter and the side of the sole.

I claim:

1. The combination in a fitted shoe packing box which includes a cover and sides; of a bottom which includes a supporting member made from a flat blank with its parts so bent that it is of substantially rectangular shape and fits the bottom, said blank having at one end a wing which is bent upwardly and is supported by a flap bent from the wing along a curved crease, a middle part of substantially the width of the first wing without the flap and having a locking slot in its edge, and another wing at the other end which is bent up and has a double flap bent down from the wing on a curved crease and is then bent outwardly on a straight crease, said flap b having a locking slot which engages the locking slot in the middle part.

2. The combination in a fitted shoe packing box of substantially rectangular parallelopiped form, the front and back ends of which are narrower than the sides, which includes a cover and a bottom formed near one end with a front wing which slopes from near the middle line up to the left side to so support the heel of the left shoe with the flat side down that the sole, the edge of which rests on the bottom, is in a plane which is at an acute angle with the side of the box; and a back wing near the other end which slopes from near the back up towards the left and is so formed as to include a shaped pocket for the toe of the left shoe and to so support the back counter part of the right shoe that the flat side of its sole is at the top and its sole is in a plane which is substantially parallel with the sole of the left shoe.

3. A supporting member forming part of the bottom of a shoe box of substantially rectangular shape and of less width than depth formed near one end with a wing which slopes from near the middle line up to the left side to so support the heel of one shoe with the flat side down that the sole, the edge of which rests on the bottom, is in a plane which is at an acute angle with the side of the box; and another wing near the other end which slopes from near one side up towards the left and is so formed as to include a shaped pocket for the toe of the first shoe and to so support the heel part of another shoe that the flat side of its sole is at the top and its sole is in a plane which is substantially parallel with the sole of the other shoe.

4. A supporting member forming part of the bottom of a shoe box made from a flat blank with its parts so bent that it is of substantially rectangular shape, said blank having at one end a wing which is bent upwardly and is supported by a flap bent from the wing along a curved crease; a middle part of substantially the width of the first wing without the flap and having a locking slot in its edge; another wing at the other end which is bent up and has a double flap bent down from the wing on a curved crease, then bent outwardly on a straight crease and having a locking slot which engages the locking slot in the middle part.

5. A supporting member forming part of the bottom of a shoe box made from a flat blank with its parts so bent that it is of substantially rectangular shape, said blank having at one end a wing which is bent upwardly and is supported by a flap bent from the wing along a crease; a middle part of substantially the width of the first wing without the flap; another wing at the other end which is bent up and has a double flap bent down from the wing on a crease, then bent outwardly on a crease.

GORDON MANN.